United States Patent
Teshima et al.

(10) Patent No.: US 7,516,837 B2
(45) Date of Patent: Apr. 14, 2009

(54) INK-JET RECORDING APPARATUS HAVING A CLEANING FLUID ABSORBER AND A SCRAPER

(75) Inventors: Hideaki Teshima, Tokoname (JP); Atsuhisa Nakashima, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 396 days.

(21) Appl. No.: 11/276,917

(22) Filed: Mar. 17, 2006

(65) Prior Publication Data
US 2006/0214983 A1 Sep. 28, 2006

(30) Foreign Application Priority Data
Mar. 24, 2005 (JP) .............................. 2005-087119

(51) Int. Cl.
*B65G 45/22* (2006.01)
(52) U.S. Cl. ...................... 198/495; 198/497; 101/423; 347/33
(58) Field of Classification Search ................. 198/495, 198/497, 499; 101/423, 424, 425; 347/1, 347/22, 33
See application file for complete search history.

(56) References Cited

U.S. PATENT DOCUMENTS

| | | | |
|---|---|---|---|
| 5,225,853 A * | 7/1993 | Kobayashi et al. ............ 347/33 |
| 6,481,046 B1 * | 11/2002 | Freund et al. ............... 101/423 |
| 6,499,841 B1 | 12/2002 | Uchida et al. |
| 6,511,152 B2 | 1/2003 | Yoshimura |
| 6,923,312 B2 * | 8/2005 | Pham et al. ................. 198/495 |
| 6,945,383 B2 * | 9/2005 | Pham ........................ 198/495 |
| 7,114,610 B2 * | 10/2006 | Behymer et al. ............. 198/497 |

FOREIGN PATENT DOCUMENTS

| | | |
|---|---|---|
| EP | 0694409 A2 | 1/1996 |
| EP | 0744301 A1 | 11/1996 |
| EP | 1136399 A2 | 9/2001 |
| JP | 2001277656 | 9/2001 |
| JP | 2004130721 | 4/2004 |
| JP | 2004196505 | 7/2004 |
| JP | 2004196505 A | 7/2004 |

OTHER PUBLICATIONS

European Patent Office, European Search Report for Related EP Application No. 06251496 dated Sep. 1, 2006.

\* cited by examiner

*Primary Examiner*—James R Bidwell
(74) *Attorney, Agent, or Firm*—Baker Botts L.L.P.

(57) ABSTRACT

An ink-jet recording apparatus has rollers, a conveyor belt, a conveyor belt driving mechanism, an ink-jet head, an absorber, a scraper, a supplier, and a supply controller. The conveyor belt spans the rollers. The driving mechanism rotates the rollers to move a record medium disposed on one surface of the conveyor belt in a predetermined conveyance direction. The absorber absorbs cleaning fluid and contacts and applies the cleaning fluid to the one surface of the conveyor belt. The scraper comes into contact with the one surface of the conveyor belt and scrapes the cleaning fluid attached to the one surface. The supplier supplies cleaning fluid to the absorber. The supply controller controls a supply of cleaning fluid from the supplier to the absorber, so that the supply controller makes the supplier supply cleaning fluid to the absorber in response to a print command, for a first period of time before the driving mechanism rotates the rollers to make the conveyor belt start traveling.

10 Claims, 10 Drawing Sheets

INK-JET RECORDING APPARATUS HAVING A CLEANING FLUID ABSORBER AND A SCRAPER

BACKGROUND OF THE INVENTION

1. Field of the Invention

The present invention relates to an ink-jet recording apparatus that conducts recording by ejecting ink to a record medium.

2. Description of Related Art

Japanese Patent Unexamined Publication No. 2004-196505 discloses an ink-jet recording apparatus, which, when a printing operation including traveling a conveyor belt and ejecting ink from ink-jet heads onto a record medium disposed on the conveyor belt is performed, brings an absorber having cleaning fluid absorbed therein into contact with the traveling conveyor belt to thereby apply the cleaning fluid to the conveyor belt and wipes off the cleaning fluid, ink, etc., from the conveyor belt by means of a rubber blade. In this ink-jet recording apparatus, after a printing operation is completed, a predetermined amount of cleaning fluid is supplied to the absorber which is then covered with a cap so as not to dry up.

SUMMARY OF THE INVENTION

The above-described ink-jet recording apparatus may invoke a problem that, when an absorber containing only a short amount of cleaning fluid comes into contact with a traveling conveyor belt, traveling of the conveyor belt becomes unstable due to strong frictional force produced between the conveyor belt and the absorber. One possible way for solving this problem is to supply cleaning fluid to the absorber such that the absorber may always keep a good amount of cleaning fluid. In this case, however, the cleaning fluid may be oversupplied and a running cost disadvantageously rises.

An object of the present invention is to provide an ink-jet recording apparatus capable of suppressing oversupply of cleaning fluid and at the same time preventing an absorber from disturbing a driving of a conveyor belt.

According to the present invention, there is provided an ink-jet recording apparatus comprising a plurality of rollers, an endless conveyor belt, a conveyor belt driving mechanism, an ink-jet head, an absorber, a scraper, a supplier, and a supply controller. The endless conveyor belt spans the rollers. The conveyor belt driving mechanism rotates the rollers so as to move, in a predetermined conveyance direction, a record medium disposed on one surface of the conveyor belt. The ink-jet head has a plurality of nozzles that eject ink to a record medium. The absorber absorbs cleaning fluid and applies the cleaning fluid to the one surface of the conveyor belt by coming into contact with the one surface of the conveyor belt. The scraper comes into contact with the one surface of the conveyor belt and scrapes the cleaning fluid attached to the one surface of the conveyor belt. The supplier supplies cleaning fluid to the absorber. The supply controller controls a supply of cleaning fluid from the supplier to the absorber, in such a manner that the supply controller, in response to a print command, makes the supplier supply cleaning fluid to the absorber for a first period of time before the conveyor belt driving mechanism rotates the rollers to make the conveyor belt start traveling.

In this aspect, before the conveyor belt starts traveling, the supplier supplies cleaning fluid to the absorber which thereby absorbs the cleaning fluid and becomes wet. This can prevent a failure in driving of the conveyor belt which might otherwise be caused when the absorber containing only a short amount of cleaning fluid comes into contact with the traveling conveyor belt. Besides, the conveyor belt can be cleaned well. Moreover, the cleaning fluid is supplied to the absorber in response to a print command. Therefore, oversupply of the cleaning fluid can be suppressed.

BRIEF DESCRIPTION OF THE DRAWINGS

Other and further objects, features and advantages of the invention will appear more fully from the following description taken in connection with the accompanying drawings in which.

DESCRIPTION OF THE PREFERRED EMBODIMENTS

In the following, preferred embodiments of the present invention will be described with reference to the accompanying drawings.

First, with reference to FIG. 1, a description will be given to a general construction of an ink-jet printer 1 according to a first embodiment of the present invention. The ink-jet printer 1 is a color ink-jet printer having four ink-jet heads 2.

Figure 1:
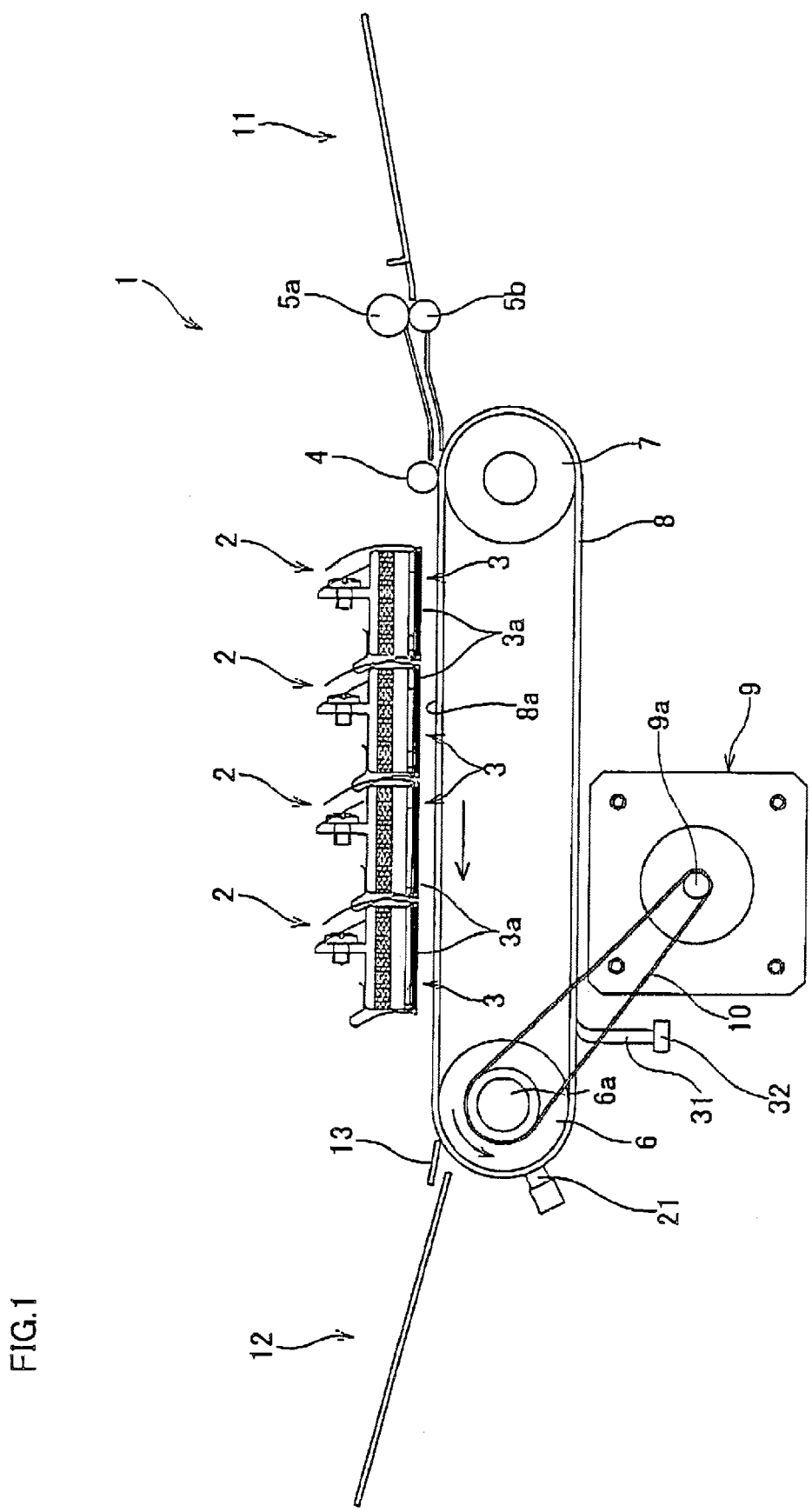
FIG. 1 is a side view of a general construction of an ink-jet printer according to a first embodiment of the present invention.

The ink-jet printer 1 has a paper feeder 11 shown righthand in FIG. 1 and a paper discharge tray 12 shown lefthand in FIG. 1. Formed inside the ink-jet printer 1 is a paper conveyance path in which a paper as a record medium is conveyed from the paper feeder 11 toward the paper discharge tray 12. A pair of feed rollers 5a, 5b is disposed immediately downstream of the paper feeder 11 with respect to a paper conveyance direction running from right to left in FIG. 1. The feed rollers 5a, 5b, which are rotated by driving of a later-described feed motor 14 (see FIG. 3), send out a paper from the paper feeder 11 onto a later-described conveyor belt 8 while pinching the paper.

Two belt rollers 6, 7, and an endless conveyor belt 8 which are wound on the rollers 6, 7 so as to span them are located at a portion of the paper conveyance path between the paper feeder 11 and the paper discharge tray 12. An outer circumferential face of the conveyor belt 8, which means a conveyor face 8a, is treated with silicone so that it has an adhesive property. A press roller 4 is disposed immediately downstream of the feed roller 5a, 5b with respect to the paper conveyance direction, at a position opposed to the belt roller 7 across the conveyor belt 8. The press roller 4 presses a paper, which has been sent out of the paper feeder 11 through the feed rollers 5a and 5b, onto the conveyor face 8a of the conveyor belt 8.

A conveyor motor 9 is disposed below the conveyor belt 8. A driving belt 10 spans a shaft 9a of the conveyor motor 9 and a shaft 6a of the belt roller 6. If the rotating shaft 9a of the conveyor motor 9 rotates counterclockwise in FIG. 1, the belt roller 6 rotates counterclockwise. Along with this counterclockwise rotation of; the belt roller 6, the conveyor belt 8 spanning the belt rollers 6 and 7 travels.

In this manner, referring to FIG. 1, the conveyor belt 8 conveys a paper, which has been pressed onto the conveyor face 8a by means of the press roller 4, downstream in the paper conveyance direction along with counterclockwise rotation of the belt roller 6, while keeping the paper thereon due to its adhesive property.

A peeling member 13 is disposed immediately downstream of the conveyor belt 8 with respect to the paper conveyance direction, at a position opposed to the belt roller 6 across the conveyor belt 8. The peeling member 13 peels a paper, which is kept on the conveyor face 9a of the conveyor belt 8, off the conveyor face 8a, and sends the paper to the paper discharge tray 12.

In FIG. 1, an absorber 21 is disposed on a lower-left side of the belt roller 6 such that the conveyor belt B is sandwiched between the belt roller 6 and the absorber 21 and at the same time the absorber 21 is always kept in contact with the conveyor face 8a of the conveyor belt 8. The absorber 21 is made of a flexible sponge having interconnected cells. The absorber 21 absorbs cleaning fluid supplied thereto, and applies the cleaning fluid to the conveyor face 8a of the conveyor belt 8 by coming into contact with the conveyor face 8a, as will be described later. The absorber 21 has a rectangular parallelepiped shape elongated in a direction perpendicularly crossing the drawing sheet of FIG. 1. A longer side of the absorber 21 has substantially the same width as that of the conveyor belt 8 along the direction perpendicularly crossing the drawing sheet of FIG. 1.

A blade 31 is disposed in a range, with respect to a direction of traveling of the conveyor belt 8, i.e., with respect to the counterclockwise direction in FIG. 1, from a point where the absorber 21 is in contact with the conveyor belt 8 to a point where the conveyor belt 8 confronts the heads 2. More specifically, in FIG. 1, the blade 31 is disposed on a lower-right side of the belt roller 6. The blade 31 is disposed in such a manner that its end is always kept in contact with the conveyor face 8a of the conveyor belt 8. The blade 31 is made of a flexible material. The blade 31, while bending, comes into contact with the conveyor face 8a of the conveyor belt B, so that its end portion scrapes cleaning fluid, ink, etc., from the conveyor face 8a. The cleaning fluid, etc. which has been scraped by the blade 31 is disposed of into a waste collector 32 provided below the blade 31.

The four ink-jet heads 2 corresponding to magenta ink, yellow ink, cyan ink, and black ink, respectively, are arranged side by side along the paper conveyance direction. The ink-jet printer 1 is of line type. Each of the ink-jet heads 2 has, at its lower end, a head main body 3. The head main body 3 is made up of a passage unit and an actuator layered on each other. In the passage unit, ink passages including nozzles and pressure chambers are formed. The actuator applies pressure to ink contained in the pressure chambers. The head main body 3 has a rectangular parallelepiped shape having its longer side extending perpendicularly to the paper conveyance direction, i.e., extending in the direction perpendicularly crossing the drawing sheet of FIG. 1. A lower face of the head main body 3 serves as an ink ejection face 3a in which formed are a large number of nozzles each having a small diameter and ejecting ink to a paper. The ink ejection face 3a confronts the conveyor face 8a of the conveyor belt B.

The head main bodies 3 are disposed such that the ink ejection faces 3a and the conveyor face 8a are in parallel with a narrow clearance formed therebetween. The paper conveyance path runs within this clearance. While a paper conveyed on the conveyor face 8a is passing just under the series of head main bodies 3 of the four heads 2, the nozzles formed in the ink ejection faces 3a eject ink of respective colors toward an upper face, i.e., a print face, of the paper, so that a desired color image is formed on the paper.

Next, a mechanism that supplies cleaning fluid to the absorber 21 will be described with reference to FIG. 2.

Figure 2:
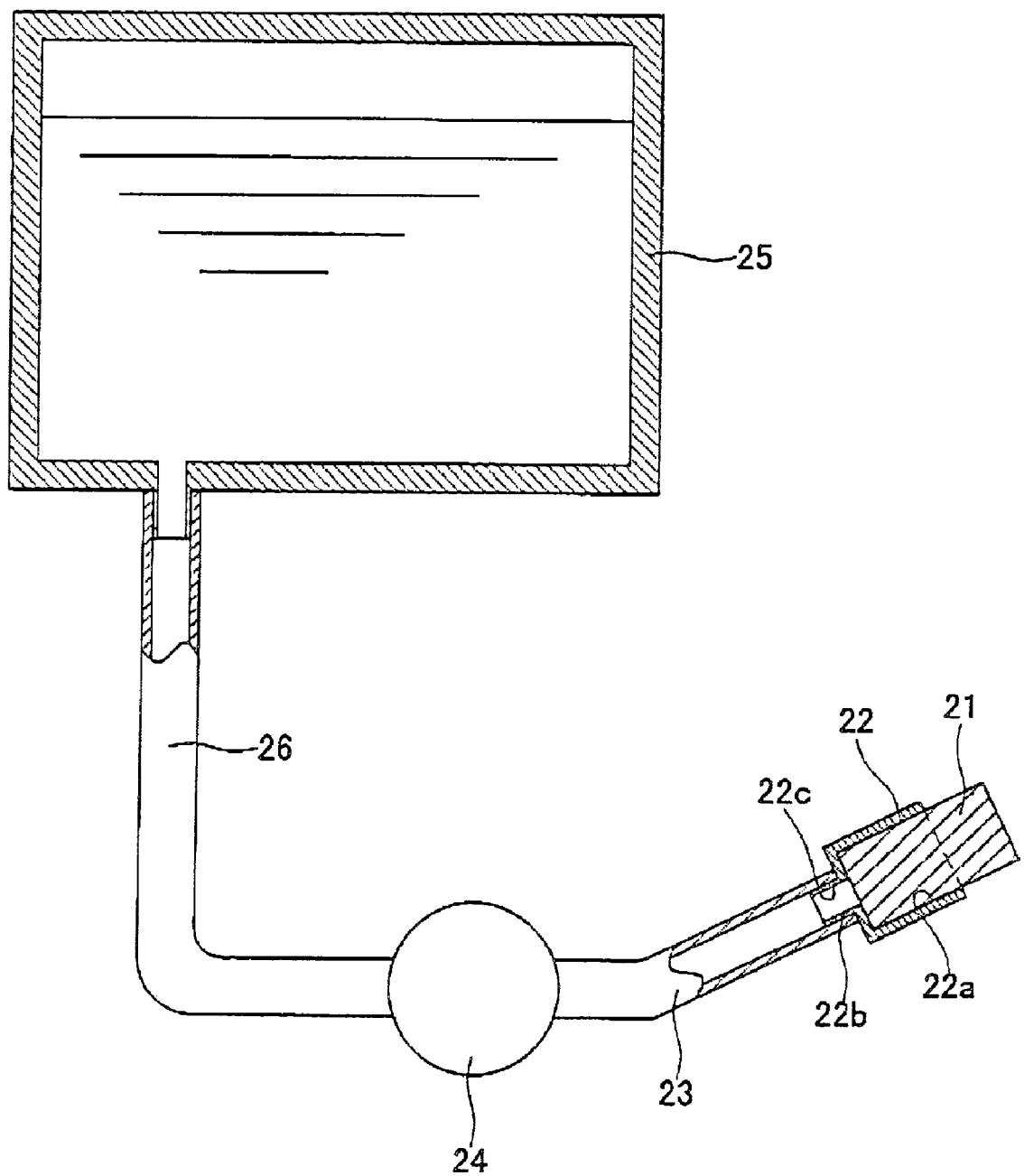
FIG. 2 schematically illustrates a mechanism that supplies cleaning fluid to an absorber included in the ink-jet printer of FIG. 1.

As shown in FIG. 2, the absorber 21 is housed within a casing 22 in which a recess 22a is formed, such that an end of the absorber 21 is exposed out. A bottom of the casing 22 has a connecting portion 22b which protrudes toward a lower left in FIG. 2. The connecting portion 22b is connected to one end of a flexible tube 23. The recess 22a and the tube 23 communicate with each other through a communication hole 22c of the connecting portion 22b.

The other end of the tube 23 is connected to one end of a valve 24. A tube 26, which is connected to a tank 25 filled with cleaning fluid, is connected to the other end of the valve 24. The tank 25 is disposed higher than the absorber 21 with respect to the vertical direction in order that the cleaning fluid contained in the tank 25 can be exhaustively supplied to the absorber 21 by use of a water-head difference between the tank 25 and the absorber 21.

When a control unit 60 of the printer 1 which will be described later makes the valve 24 open, the cleaning fluid contained in the tank 25 is supplied to the absorber 21 through the tube 26, the valve 24, the tube 23, and the casing 22. When the control unit 60 makes the valve, 24 closed, a supply of the cleaning fluid to the absorber 21 is shut off.

Figure 3:
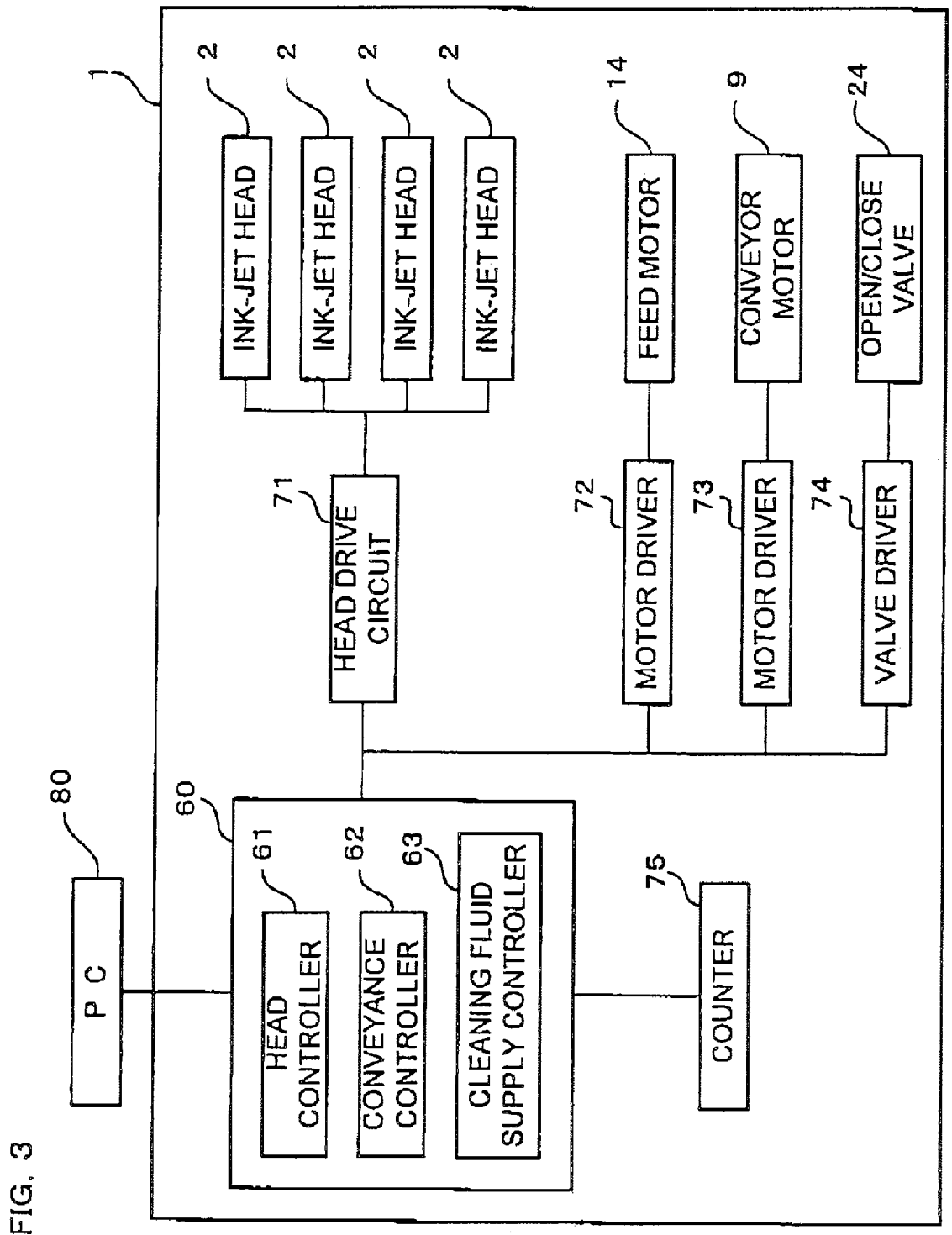
FIG. 3 is a block diagram showing an electrical construction of the ink-jet printer of FIG. 1.

Next, an electrical construction of the ink-jet printer 1 will be described with reference to FIG. 3.

The control unit 60 that controls the ink-jet printer 1 has a CPU (Central Processing Unit) that is an arithmetic processing unit, a ROM (Read Only Memory) that stores a control program executed by the CPU and data used for the control program, and a RAM (Random Access Memory) that temporarily stores data during execution of a program. The control unit 60 includes a head controller 61, a conveyance controller 62, and a cleaning fluid supply controller 63. A head drive circuit 71, a motor drivers 72, 73, a valve driver 74, and a counter 75 are connected to the control unit 60. The counter 75 measures how much time has elapsed since a last supply of cleaning fluid was completed and how much time has elapsed since a printing operation detailed later was started.

When a print signal as a print command is received from an external PC (Personal Computer) 80, the head controller 61 controls the head drive circuit 71 so as to eject ink from a corresponding ink-jet head 2 in accordance with this print signal.

When a print signal as a print command is received from the external PC 80, the conveyance controller 62 controls a motor driver 72 so as to drive the feed motor 14, and at the same time controls a motor driver 73 so as to drive the conveyor motor 9. If the conveyance controller 62 controls the motor drivers 72 and 73 in this way, the motor driver 72 drives the feed motor 14 so as to rotate the feed rollers 5a, 5b thereby sending a paper out of the paper feeder 11 onto the conveyor belt 8, and moreover the motor driver 73 drives the conveyor motor 9 so as to rotate the belt roller 6 thereby traveling the conveyor belt 8 and conveying in the paper conveyance direction the paper which has been sent out onto the conveyor belt 8.

When a print signal as a print command is received from the external PC 80, before the conveyance controller 62 controls the motor driver 73 to make the conveyor belt 8 start traveling, the cleaning fluid supply controller 63 controls a valve driver 74 so as to open the valve 24 for 0.7 seconds during which cleaning fluid is allowed to be supplied to the absorber 21. In addition, in a printing operation, at, fifteen-seconds intervals from a start of this printing operation, the cleaning fluid supply controller 63 controls the valve driver 74 so as to open the valve 24 for 0.5 seconds during which cleaning fluid is allowed to be supplied to the absorber 21. Further, when a main power source of the printer is powered up after an interval of five hours or more since a last supply of cleaning fluid was completed, the cleaning fluid supply controller 63 controls the valve driver 74 so as to open the valve 24 for 6 seconds during which cleaning fluid is allowed to be supplied to the absorber 21.

Next, with reference to FIG. 4, a description will be given to a supply of cleaning fluid to the absorber 21, which is performed when the main power source of the printer is powered up.

First, the main power source of the printer is powered up (S1). Then, the cleaning fluid supply controller 63 determines, based on a time measured by the counter 75, whether five hours or more have elapsed since a last supply of cleaning fluid was completed (S2). If less than five hours have elapsed (S2: NO), the processing proceeds to 56 which will be described later. If not less than five hours have elapsed (S2: YES), the cleaning fluid supply controller 63 controls the valve driver 74 so as to open the valve 24 (S3).

Following S3, the cleaning fluid supply controller 63 determines, based on a time measured by the counter 75, whether six seconds have elapsed since the valve 24 was opened (S4). If six seconds have not elapsed (S4: NO), the processing repeats 54. If six seconds have elapsed (S4: YES), the cleaning fluid supply controller 63 controls the valve driver 74 so as to close the valve 24 (S5). Subsequently, the cleaning fluid supply controller 63 outputs a reset signal to the counter 75, in order to return the time measured by the counter 75 to zero (S6).

Figure 5:
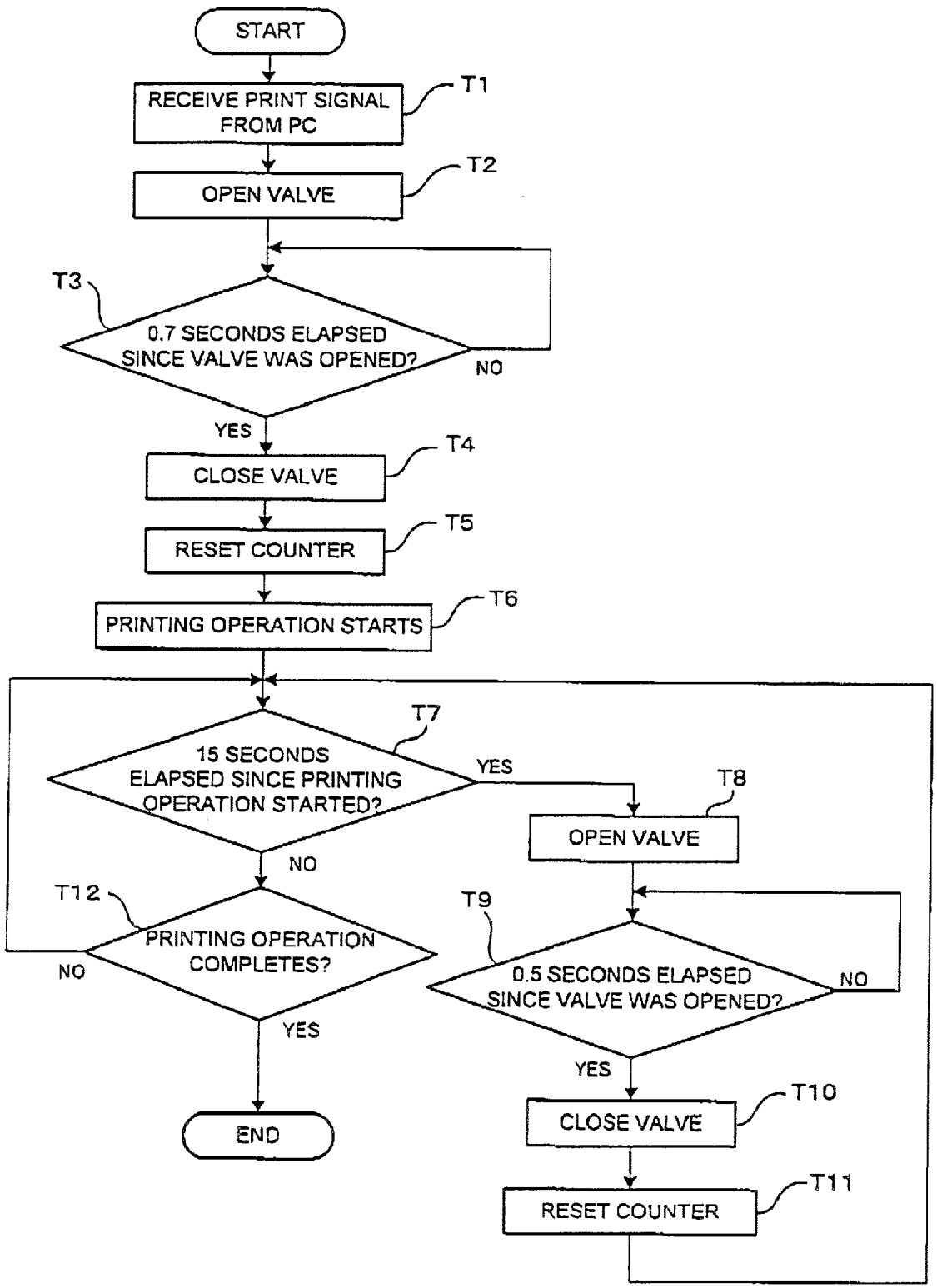
FIG. 5 is a flowchart showing a supply of cleaning fluid to the absorber at the time when the ink-jet printer of FIG. 1 receives a print signal.

Next, with reference to FIG. 5, a description will be given to a supply of cleaning fluid to the absorber 21, which is performed when a print signal is received from the PC 80.

First, the control unit 60 receives a print signal from the external PC 80 (T1). Then, the cleaning fluid supply controller 63 controls the valve driver 74 so as to open the valve 24 (T2). Then, the cleaning fluid supply controller 63 determines, based on a time measured by the counter 75, whether 0.7 seconds have elapsed since the valve 24 was opened (T3). If 0.7 seconds have not elapsed (T3: NO), the processing repeats T3. If 0.7 seconds have elapsed (T3: YES), the cleaning fluid supply controller 63 controls the valve driver 74 so as to close the valve 24 (T4). Subsequently, the cleaning fluid supply controller 63 outputs a reset signal to the counter 75, in order to return the time measured by the counter 75 to zero (T5).

After T5, a printing operation is started (T6). More specifically, the conveyance controller 62 controls the motor drivers 72 and 73 so as to start driving the feed rollers 5a, 5b and the conveyor motor 9, so that the paper feeder 11 starts rotating and the conveyor belt 8 starts traveling. Thus, the paper sent out onto the conveyor belt 8 is conveyed in the paper conveyance direction. Moreover, the head controller 61 controls the head drive circuit 71 so as to drive the ink-jet heads 2, so that the ink-jet heads 2 eject ink to the paper that is disposed on the conveyor face 8a of the conveyor belt 8.

After T6, the cleaning fluid supply controller 63 determines, based on a time measured by the counter 75, whether fifteen seconds have elapsed since the printing operation was started (T7). If fifteen seconds have not elapsed (T7: NO), the processing proceeds to T12 which will be described later. If fifteen seconds have elapsed (T7: YES), the cleaning fluid supply controller 63 controls the valve driver 74 so as to open the valve 24 (T8).

After T8, the cleaning fluid supply controller 63 determines, based on a time measured by the counter 75, whether 0.5 seconds have elapsed, since the valve 24 was opened (T9). If 0.5 seconds have not elapsed (T9: NO), the processing repeats T9. If 0.5 seconds have elapsed (T9: YES), the cleaning fluid supply controller 63 controls the valve driver 74 so as to close the valve 24 (T10).

After T10, the cleaning fluid supply controller 63 outputs a reset signal to the counter 75, in order to return the time measured by the counter 75 to zero (T11). Then, the processing returns to T7. In T11, the counter 75 once returns its measurement time to zero. Thereafter, if the printing operation continues, the counter 75 starts measuring a time again.

In T12, the control unit 60 determines whether the printing operation associated with the print signal received in T1 has been completed. If the printing operation has not yet been completed (T12: NO), the processing returns to T7. If the printing operation has been completed (T12: YES), i.e., the conveyance controller 62 has controlled the motor drivers 72 and 73 so as to stop driving the feed rollers 5a, 5b, and the conveyor motor 9 and the head controller 61 has controlled the head drive circuit 71 so as to stop driving the ink-jet heads 2, this routine is ended.

In this embodiment, as described above, the cleaning fluid is supplied to the absorber 21 only in three cases, and it is not supplied in other cases. The three cases mean, a time when the main power source of the printer is powered up (see FIG. 4), a time after a print signal is received (T1 of FIG. 5) and before a printing operation is started (TG of FIG. 5), and a time while a printing operation is performed (T6 to T12 of FIG. 5). The absorber 21 which is dry may cause the conveyor belt 8 to travel in an unstable manner. However, in a case, for example, a paper is conveyed without printing conducted thereon, it is not necessary to stabilize traveling of the conveyor belt 8, and therefore the cleaning fluid is not supplied.

Next, with reference to FIG. 6, a description will be given to how the absorber 21 and the blade 31 operate at the time of cleaning the conveyor belt 8.

Figure 6A:
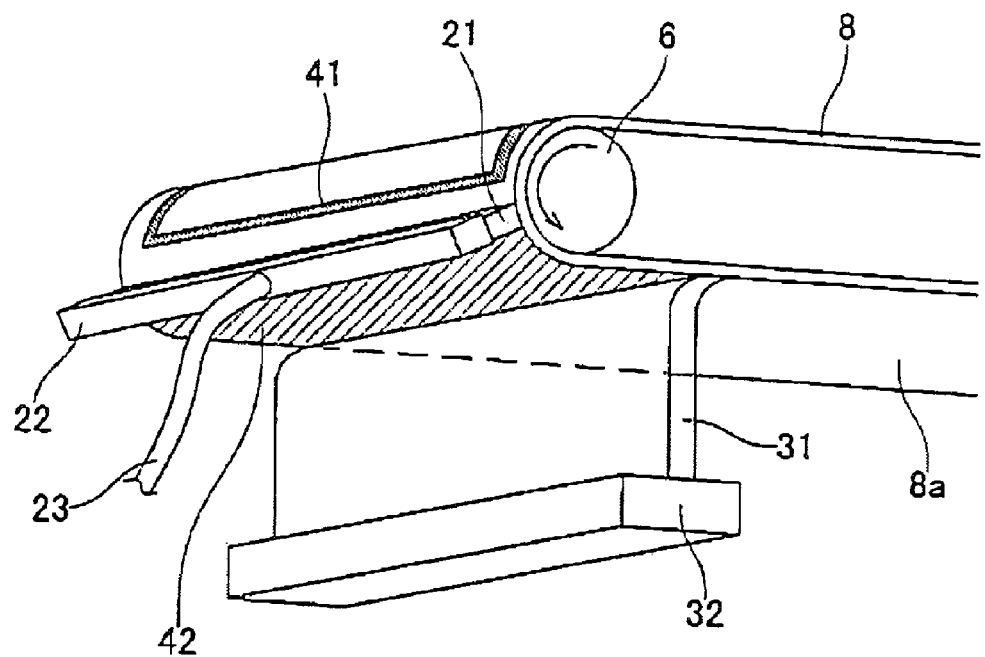
FIGS. 6A and 6B are views explaining how the absorber and a blade included in the ink-jet printer of FIG. 1 operate at the time of cleaning a conveyor belt.

In a marginless printing mode in which the ink-jet heads 2 eject ink so as to attach the ink throughout an entire print face of a paper, an ink-attachment region 41 of annular shape along an outer edge of the paper appears on the conveyor face 8a of the conveyor belt 8, as shown in FIG. 6A. The conveyor face 8a of the conveyor belt 8 has, between its portion contacted by the absorber 21 and its portion contacted by the blade 31, a cleaning-fluid application region 42 which has been made by the absorber 21 applying cleaning fluid along with traveling of the conveyor belt 8.

Figure 6B:
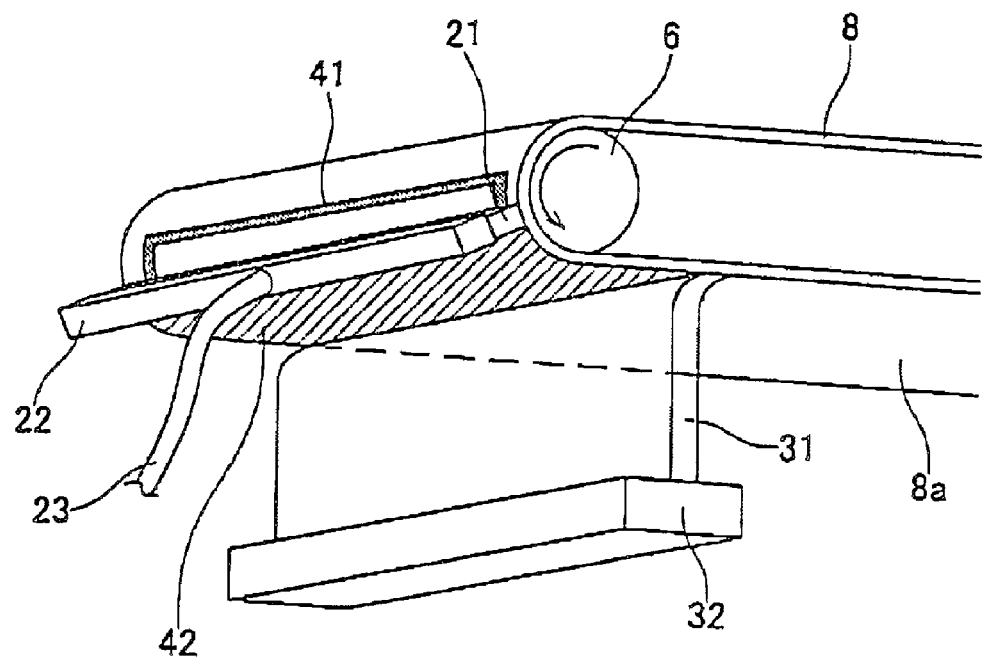

After the ink-attachment region 41 passes, along with traveling of the conveyor belt 8, through the point at which the conveyor face 8a is in contact with the absorber 21 as shown in FIG. 6B, a mixture of ink in the ink-attachment region 41 and cleaning fluid in the cleaning-fluid application region 42, which means cleaning fluid in the cleaning-fluid application region 42 with the ink in the ink-attachment region 41 dissolved therein, appears on a part of the conveyor face 8a between its portion contacted by the absorber 21 and its portion contacted by the blade 31. The amount of cleaning fluid that is applied to the cleaning-fluid application region 42 is, per unit area, several to several tens of times larger than the amount of ink that is attached in the ink-attachment region 41. Like this, the ink of the ink-attachment region 41 is diluted with the large amount of cleaning fluid, and then the ink together with the cleaning fluid is scraped off by the blade 31 as the conveyor belt 8 travels. As a result, the ink and the cleaning fluid hardly remain attached in a part: of the conveyor face 8a downstream from the blade 31 with respect to the traveling direction of the conveyor belt 8. Therefore, when the conveyor belt 8 further travels and a paper is disposed on a part of the conveyor belt 8a from which the blade 31 has scraped the ink and the cleaning fluid, no ink and no cleaning fluid are attached to the paper.

In the above, cleaning of the ink-attachment region 41 resulting from a marginless printing has been described. However, this is not limitative. In a case where ink floating in air, ink scattered upon ejection from the ink-jet heads 2 to a paper, or the like is attached to the conveyor face 8a of the conveyor belt 8, this ink can be cleaned off using the absorber 21 and the blade 31 in the above-described manner.

In the ink-jet printer of this embodiment, as thus far described above, before the conveyor belt 8 starts traveling (T6 of FIG. 5), the cleaning fluid supply controller 63 of the control unit 60 controls the valve 24 so as to supply cleaning fluid to the absorber 21 (T1 to T4 of FIG. 5) which thereby absorbs the cleaning fluid and becomes wet. This can prevent a failure in driving of the conveyor belt 8 which might otherwise be caused when the absorber 21 containing only a short amount of cleaning fluid comes into contact with the traveling conveyor belt 8. At the same time, the conveyor belt 8 can be cleaned well.

Cleaning fluid is supplied neither for the purpose of always keeping a good amount of cleaning fluid in the absorber 21 nor when cleaning of the conveyor belt 8 is not needed, e.g., when the printer stands by for a printing operation. Alternatively, cleaning fluid is supplied to the absorber 21 in response to a print signal, as shown in FIG. 5. Therefore, oversupply of the cleaning fluid can be suppressed.

Moreover, since cleaning fluid is supplied to the absorber 21 before the conveyor belt 8 starts traveling, there is no need to take any measures against dry-up of the absorber 21. Consequently, a cap for preventing dry-up of the absorber, a mechanism for capping and uncapping the absorber, etc. are not needed, and therefore the apparatus can be downsized.

In a printing operation, cleaning fluid is supplied to the absorber 21 (T6 to T12 of FIG. 5) at regular intervals, to be more specific, at fifteen-seconds intervals. Accordingly, even if the printing operation continues for a long time, dry-up of the absorber 21 can surely be prevented.

A period of time (0.5 seconds) during which the valve 24 is kept opened in a printing operation is shorter than a period of time (0.7 seconds) during which the valve 24 is kept opened just before a printing operation. That is, a period of time during which the cleaning fluid is supplied to the absorber 21 is shorter in a printing operation than just before a printing operation, and therefore the amount of cleaning fluid supplied to the absorber 21 is smaller in a printing operation than just before a printing operation. Accordingly, during a printing operation, a good amount of cleaning fluid can be kept contained in the absorber 21. Here, a good amount of cleaning fluid means one which does not disturb driving of the conveyor belt 8 but enables a desired amount of cleaning fluid to be applied to the conveyor face ea of the conveyor belt 8. In addition, oversupply of the cleaning fluid to the absorber 21 can be suppressed, thus preventing rise in a running cost.

Figure 4:
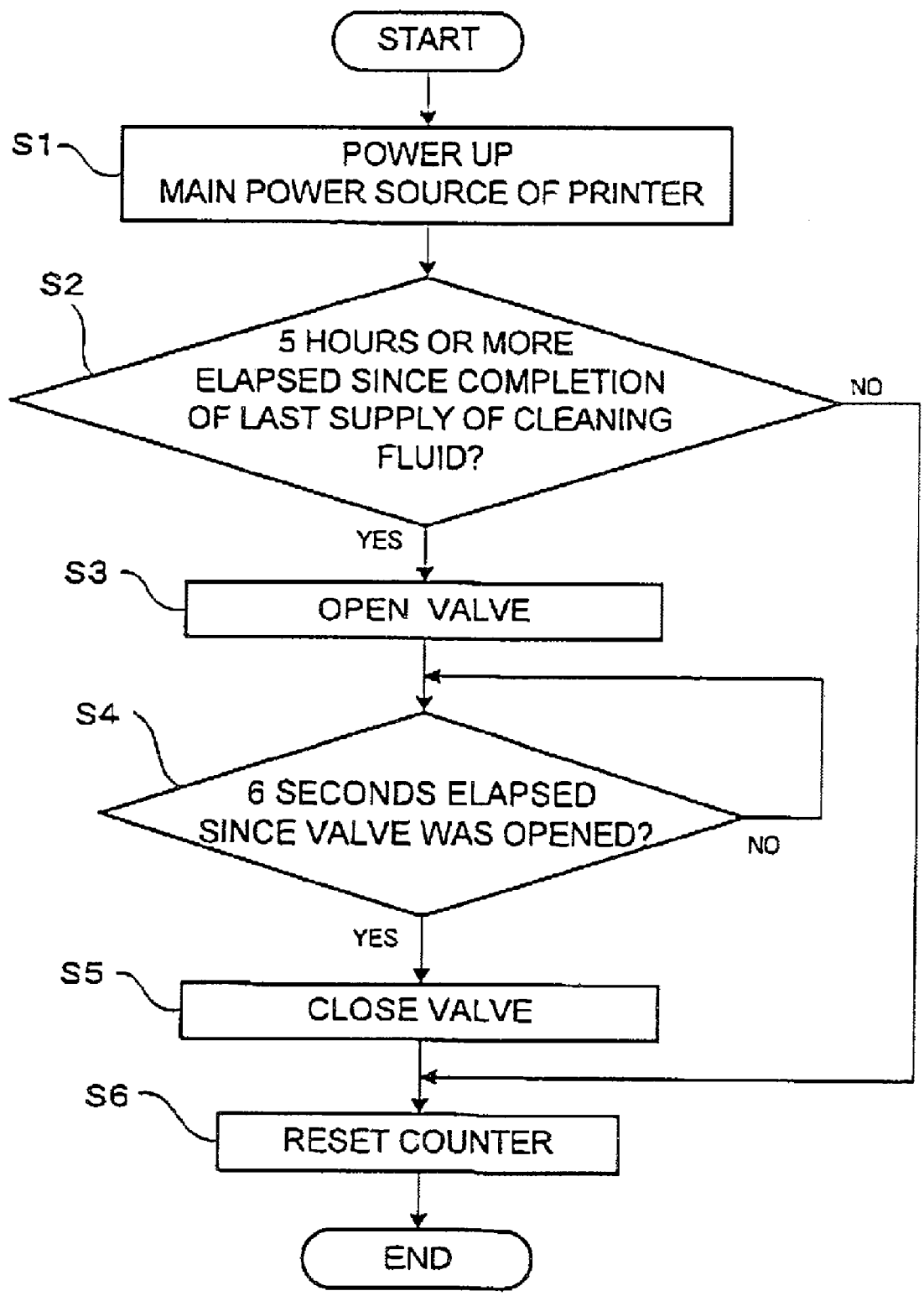
FIG. 4 is a flowchart showing a supply of cleaning fluid to the absorber at the time when a main power source of the ink-jet printer is powered up.

Cleaning fluid is supplied to the absorber 21 only when the main power source of the printer is powered up after an interval of five hours or more since a last supply of cleaning fluid was completed, i.e., only when there is a high likelihood that the absorber 21 is dry (see FIG. 4). If cleaning fluid is supplied to the absorber 21 every time the main power source of printer is powered up, the cleaning fluid may be oversupplied to disadvantageously raise the running cost as described above. Such a problem can be relieved in this embodiment.

A period of time (6 seconds) during which the valve 24 is kept opened when the main power source of the printer is powered up is longer than a period of time (0.7 seconds) during which the valve 24 is kept opened just before a printing operation. That is, a period of time during which the cleaning fluid is supplied to the absorber 21 is longer when the main power source of the printer is powered up than just before a printing operation, and therefore the amount of cleaning fluid supplied to the absorber 21 is larger when the main power source of the printer is powered up than just before a printing operation. Accordingly, even if the main power source of the printer stays powered down for a long time so that the absorber 21 is almost completely dry, the absorber 21 can sufficiently get wet because a relatively large amount of cleaning fluid is supplied to the absorber 21.

As a member for supplying cleaning fluid to the absorber 21, there is provided, as shown in FIG. 2, the tank 25 that reserves cleaning fluid, a tube 23, 26 that connect the absorber 21 to the tank 25, and the valve 24 that opens or closes a passage extending through the tubes 23, 26. Therefore, based on a period of time for opening and closing the valve 24, the amount of cleaning fluid supplied to the absorber 21 can easily be controlled.

Next, an ink-jet printer according to a second embodiment of the present invention will be described. An ink-jet printer 100 of this embodiment is substantially the same as the ink-jet printer of the first embodiment, except for a mechanism that supplies cleaning fluid to the absorber 21, an electrical construction, and a method for supplying cleaning fluid to the absorber 21. In the following, the same members as in the first embodiment will be denoted by the common reference numerals, without a specific description thereof.

First, a mechanism that supplies cleaning fluid to the absorber 21 according to the second embodiment will be described with reference to FIG. 7.

In this embodiment, the valve 24 of the first embodiment (see FIG. 2) is replaced with a pump 90. With the valve 24 as in the first embodiment, the tank 25 must be disposed higher than the absorber 21 with respect to the vertical direction in order that cleaning fluid contained in the tank 25 can be exhaustively supplied. In this embodiment, however, since the valve 24 is replaced with the pump 90, driving the pump 90 can force cleaning fluid contained in a tank 91 to be supplied to the absorber 21 via the tubes 23, 26 irrespective of where the tank 91 is disposed. Thus, this embodiment gives a degree of freedom to where the tank 91 should be disposed.

In addition, the amount of cleaning fluid supplied to the absorber 21 can easily be controlled based on a period of time during which the pump 90 is being driven.

Figure 8:
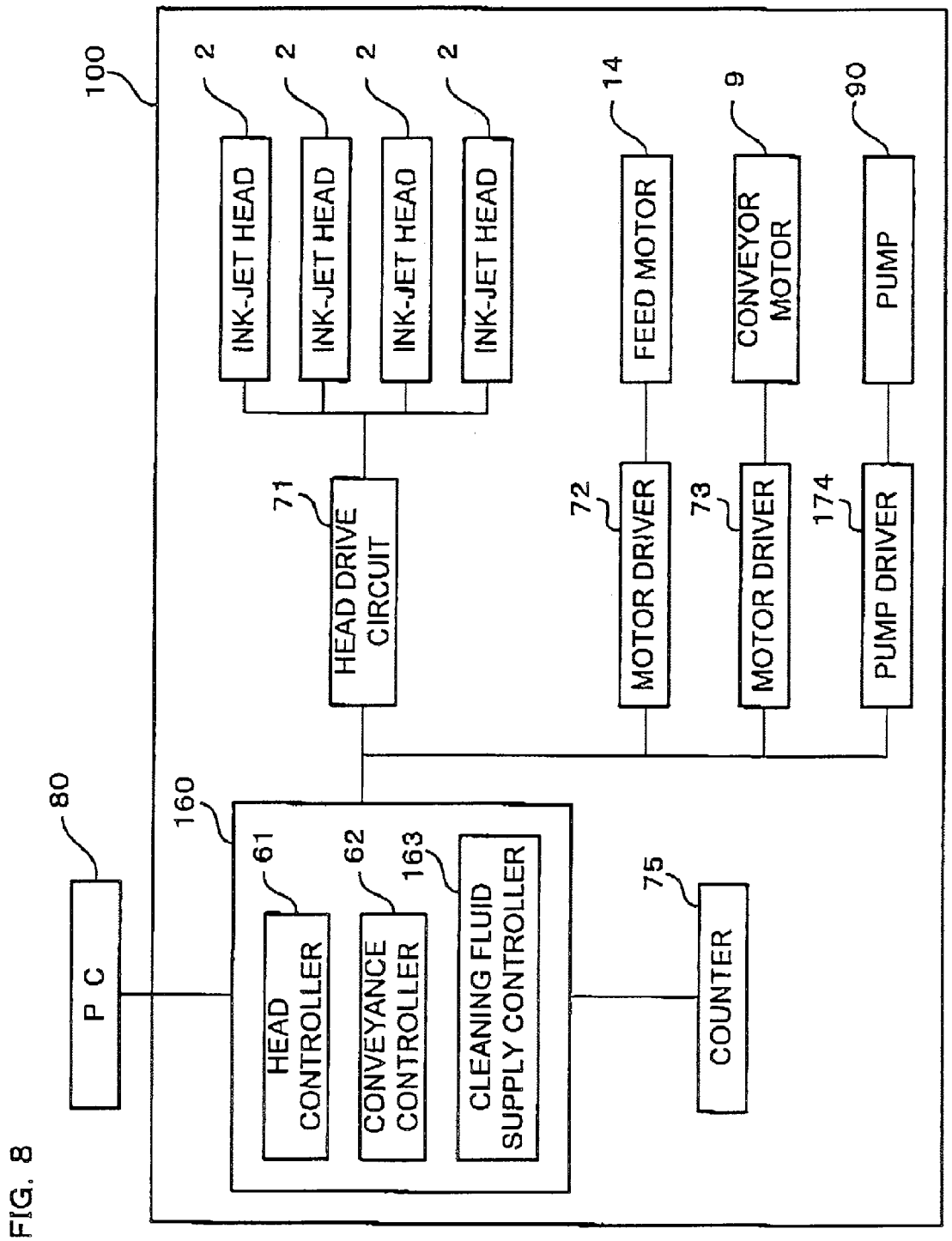
FIG. 8 is a block diagram showing an electrical construction of the ink-jet printer according to the second embodiment of the present invention.

Next, an electrical construction of the ink-jet printer 100 according to the second embodiment will be described with reference to FIG. 8.

A control unit 160 that controls the ink-jet printer 100 has a CPU (Central Processing Unit) that is an arithmetic processing unit, a ROM (Read Only Memory) that stores a control program executed by the CPU and data used for the control program, and a RAM (Random Access Memory) that temporarily stores data during execution of a program. The control unit 160 includes a head controller 61 and a conveyance controller 62 both of which are the same as those of the first embodiment, and further includes a cleaning fluid supply controller 163 which will be described later. Connected to the control unit 160 are, in addition to a head drive circuit 71, motor drivers 72, 73, and a counter 75 which are the same as those of the first embodiment, a pump driver 174 instead of the valve driver 74 of the first embodiment. The pump driver 174 is controlled by the control unit 160 so as to drive the pump 90.

When a print signal is received from the external PC 80, before the conveyance controller 62 controls to make the conveyor belt 8 start traveling, the cleaning fluid supply controller 163 controls the pump driver 174 so as to drive the pump 90 for 0.7 seconds during which cleaning fluid is allowed to be supplied to the absorber 21. In addition, in a printing operation, every time printing has been made on fifteen papers, the cleaning fluid supply controller 163 controls the pump driver 174 so as to drive the pump 90 for 0.5 seconds during which cleaning fluid is allowed to be supplied to the absorber 21. Further, when a main power source of the printer 100 is powered up after an interval of five hours or more since a last supply of cleaning fluid was completed, the cleaning fluid supply controller 163 controls the pump driver 174 so as to drive the pump 90 for six seconds during which cleaning fluid is allowed to be supplied to the absorber 21.

Figure 9:
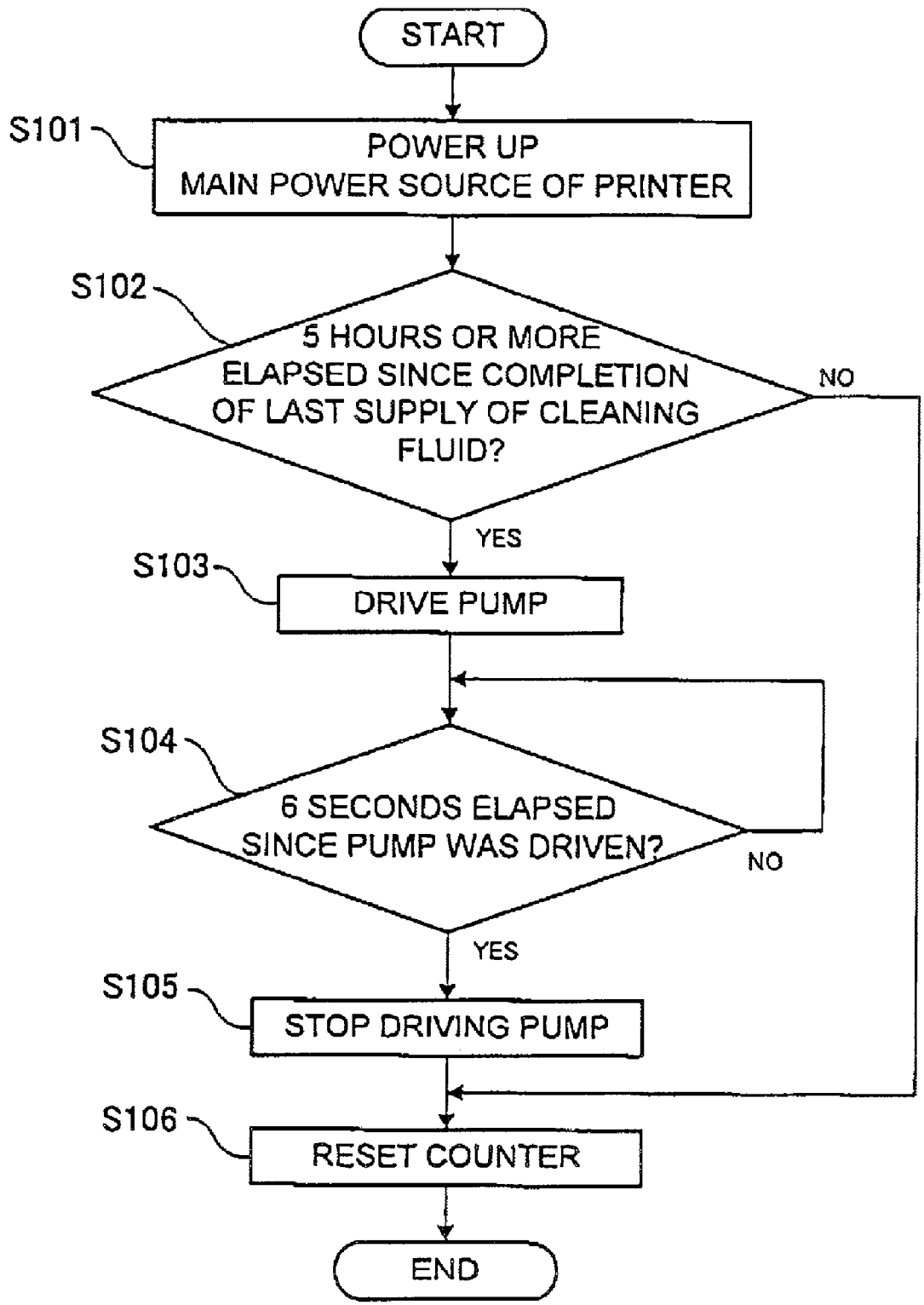
FIG. 9 is a flowchart showing a supply of cleaning fluid to the absorber at the time when a main power source of the ink-jet printer according to the second embodiment of the present invention is powered up.

Next, with reference to FIG. 9, a description will be given to a supply of cleaning fluid to the absorber 21, which is performed when the main power source of the ink-jet printer 100 of the second embodiment is powered up.

First, the main power source of the printer is powered up (S101). Then, the cleaning fluid supply controller 163 determines, based on a time measured by the counter 75, whether five hours or more have elapsed since a last supply of cleaning fluid was completed (S102). If less than five hours have elapsed (S102: NO), the processing proceeds to S106 which will be described later. If not less than five hours have elapsed (S102: YES), the cleaning fluid supply controller 163 controls the pump driver 174 so as to drive the pump 90 (S103).

Following S103, the cleaning fluid supply controller 163 determines, based on a time measured by the counter 75, whether six seconds have elapsed since the pump 90 was driven (S104). If six seconds have not elapsed (S104: NO), the processing repeats S104. If six seconds have elapsed (S104: YES), the cleaning fluid supply controller 163 controls the pump driver 174 so as to stop driving the pump 90 (S105) Subsequently, the cleaning fluid supply controller 163 outputs a reset signal to the counter 75, in order to return the time measured by the counter 75 to zero (S106).

Next, with reference to FIG. 10, a description will be given to a supply of cleaning fluid to the absorber 21, which is performed when a print signal is received from the PC 80 in the second embodiment.

First, the control unit 160 receives a print signal from the external PC 80 (T101). Then, the cleaning fluid supply controller 163 controls the pump driver 174 so as to drive the pump 90 (T102) Then, the cleaning fluid supply controller 163 determines, based on a time measured by the counter 75, whether 0.7 seconds have elapsed since the pump 90 was driven (T103). If 0.7 seconds have not elapsed (T103: NO), the processing repeats T103. If 0.7 seconds have elapsed (T103: YES), the cleaning fluid supply controller 163 controls the pump driver 174 so as to stop driving the pump 90 (T104). Subsequently, the cleaning fluid supply controller 163 outputs a reset signal to the counter 75, in order to return the time measured by the counter 75 to zero (T105).

After T5, a printing operation is started (T6), in the same manner as in T6 of the first embodiment as described above. Then, in T107, the cleaning fluid supply controller 163 determines whether printing has been made on fifteen papers in the printing operation that is associated with the print signal received in T101. If printing has not yet been conducted on fifteen papers (T107: NO), the processing proceeds to T112 which will be described later. If printing has been conducted on fifteen papers (T107: YES), the cleaning fluid supply controller 163 controls the pump driver 174 so as to drive the pump 90 (T108).

After T108, the cleaning fluid supply controller 163 determines, based on a time measured by the counter 75, whether 0.5 seconds have elapsed since the pump 90 was driven (T109). If 0.5 seconds have not elapsed (T109: NO), the processing repeats T109. If 0.5 seconds have elapsed (T109: YES), the cleaning fluid supply controller 163 controls the pump driver 174 so as to stop driving the pump 90 (T110).

After T110, the cleaning fluid supply controller 163 outputs a reset signal to the counter 75, in order to return the time measured by the counter 75 to zero (T111). Then, the processing returns to T107. In T111, the counter 75 once returns its measurement time to zero. Thereafter, if the printing operation continues, the counter 75 starts measuring a time again.

In T112, the control unit 160 determines whether the printing operation associated with the print signal received in T101 has been completed. If the printing operation has not yet been completed (T112: NO), the processing returns to T107. If the printing operation has been completed (T112: YES), i.e., the conveyance controller 62 has controlled the motor drivers 72 and 73 so as to stop driving the feed rollers 5a, 5b, and the conveyor motor 9 and the head controller 61 has controlled the head drive circuit 71 so as to stop driving the ink-jet heads 2, this routine is ended in the same manner as in the first embodiment.

In the ink-jet printer 100 of the second embodiment, as described above, the control unit 160 controls in a way slightly different from in the first embodiment because the valve 24 of the first embodiment is replaced with the pump 90. However, the other operations are substantially the same as those performed in the first embodiment, and therefore, the same effects as of the first embodiment can be obtained.

Figure 10:
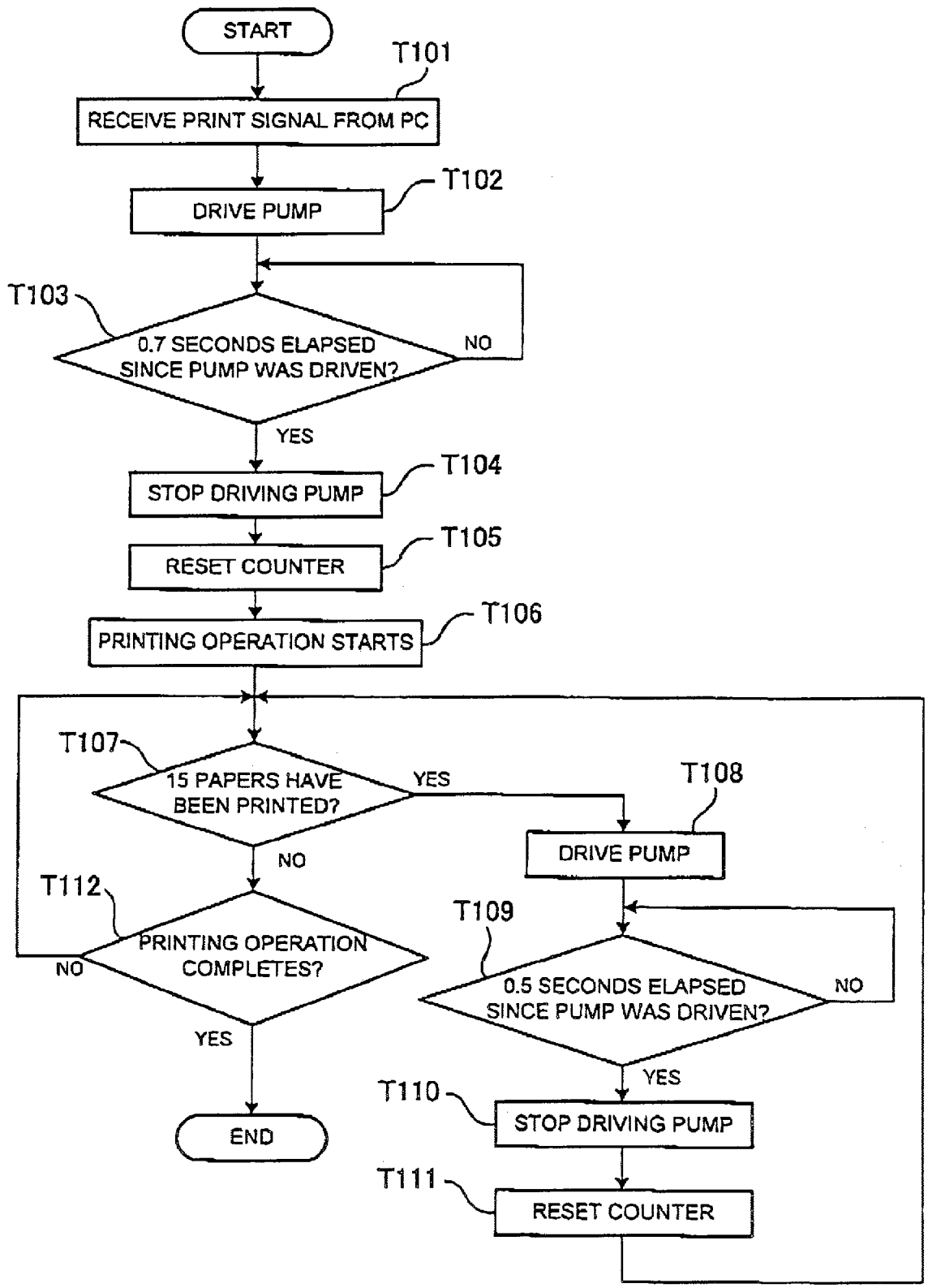
FIG. 10 is a flowchart showing a supply of cleaning fluid to the absorber at the time when the ink-jet printer according to the second embodiment of the present invention receives a print signal.

Particularly in the second embodiment, in a printing operation, the cleaning fluid is supplied to the absorber 21 every time printing has been conducted on fifteen papers (T106 to T112 of FIG. 10). Accordingly, even if printing is conducted on a large number of papers, dry-up of the absorber 21 can surely be prevented. As the number of papers conveyed increases, the conveyor belt 8 travels for a longer time. In this case, the absorber 21 applies a larger amount of cleaning fluid to the conveyor belt 8, and therefore the amount of cleaning fluid contained in the absorber decreases, which may cause the absorber 21 to dry up more easily. In this embodiment, however, the cleaning fluid is supplied to the absorber 21 every time a predetermined number of papers have been printed. Consequently, the absorber 21 can be kept wet, to suppress a failure in driving of the conveyor belt 8 during a printing operation.

The cleaning fluid may be supplied to the absorber 21 at least in a period from a reception of a print signal (T1 of FIG. 5 and T101 of FIG. 10) to a start of a printing operation (T6 of FIG. 5 and T106 of FIG. 10), and may not necessarily be supplied to the absorber 21 in a printing operation. In addition, the cleaning fluid may not be supplied to the absorber 21 even when the main power source of the printer is powered up after an interval of five hours or more since a last supply of the cleaning fluid was completed. In these cases, control programs for the cleaning fluid supply controllers 63, 163 are simplified.

How long the valve 24 is kept opened and how long the pump 90 is kept driven can appropriately be changed depending on a material of the absorber 21, a kind of the pump 90, a kind of the cleaning fluid, etc.

In a case where the cleaning fluid is supplied to the absorber 21 regularly in a printing operation, an interval of supply is not limited to fifteen seconds, but may variously be changed. Moreover, the cleaning fluid may be supplied every time an arbitrary number of papers, other than fifteen papers, have been printed. Further, a period of time for supplying the cleaning fluid in a printing operation may be equal to or longer than a period of time for supplying the cleaning fluid just before a printing operation.

The cleaning fluid may be supplied to the absorber 21 when the main power source of the printer is powered up after an arbitrary interval other than five hours since a last supply of cleaning fluid was completed. Besides, a period of time for supplying the cleaning fluid at this time may be equal to or shorter than a period of time for supplying the cleaning fluid just before a printing operation.

How long the valve 24 is kept opened or how long the pump 90 is kept driven can be changed depending on a time elapsed from completion of the last supply of the cleaning fluid to a powerup of the main power source of the printer. For example, the cleaning fluid supply controller 63, 163 may control the valve driver 74 or the pump driver 174 so as to open the valve 24 or drive the pump 90 for one second if the time elapsed is not less than zero hour and less than one hour, for two seconds if the time elapsed is not less than one hour and less than two hours, for three seconds if the time elapsed is not less than two hours and less than three hours, for four seconds if the time elapsed is not less than three hours and less than four hours, for five seconds if the time elapsed is not less than four hours and less than five hours, and for six seconds if the time elapsed is not less than five hours. As a consequence, even if a relatively short time, e.g., less than five hours, has elapsed from completion of the last supply of the cleaning fluid to a powerup of the main power source of the printer, the absorber 21 can get wet to a proper degree. That is, the absorber 21 keeps substantially constant wetness, and therefore the conveyor belt 8 which is in contact with the absorber 21 can travel in a stable manner.

A material of the absorber 21 may be not only a sponge but also various ones such as a felt, as long as it can absorb cleaning fluid and apply the cleaning fluid to the conveyor face 8a of the conveyor belt 8 by coming into contact with the conveyor face 8a.

Figure 7:
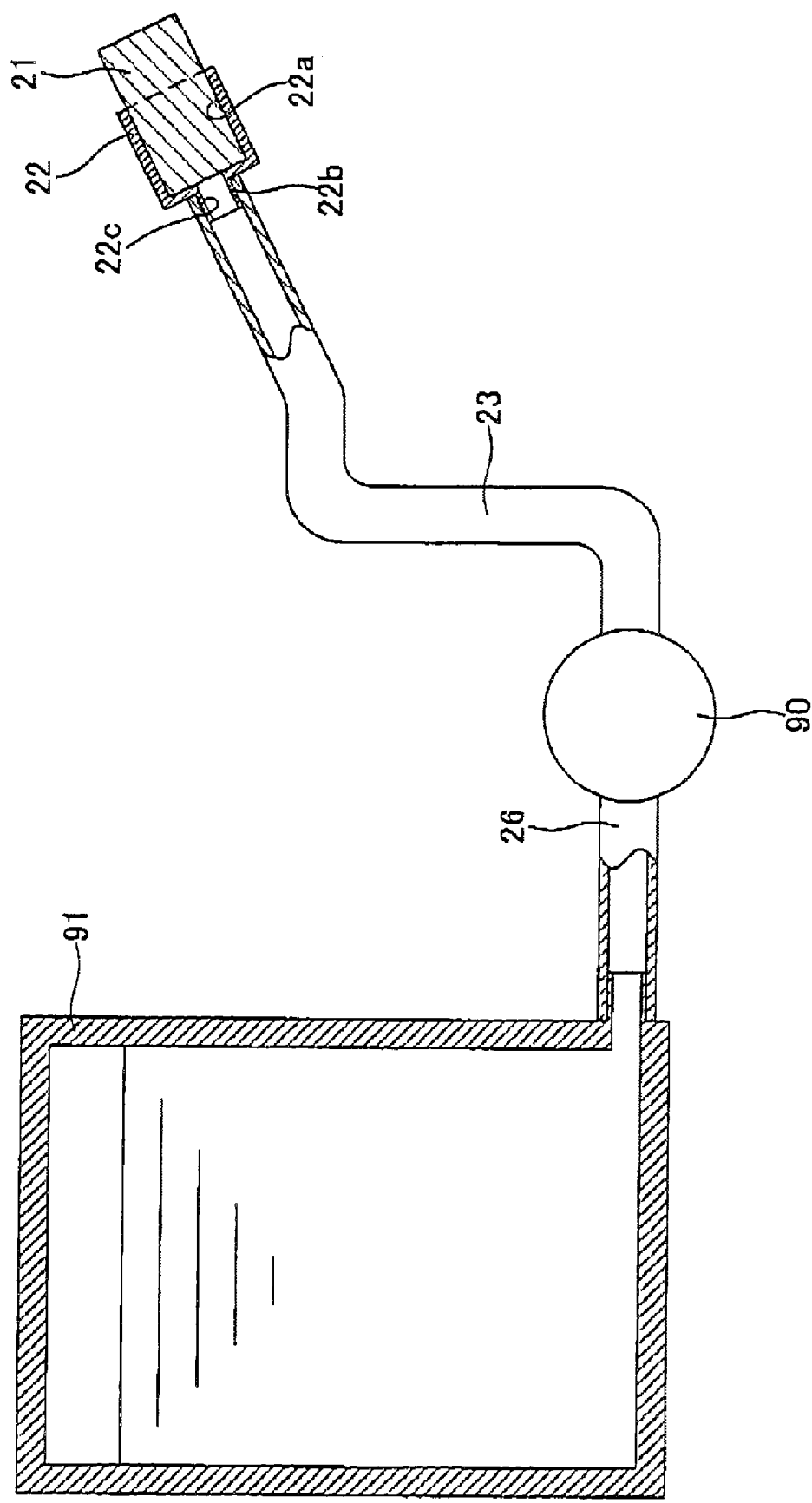
FIG. 7 schematically illustrates a mechanism that supplies cleaning fluid to an absorber included in an ink-jet printer according to a second embodiment of the present invention.

A mechanism that supplies cleaning fluid to the absorber 21 is not limited to ones shown in FIGS. 2 and 7, but may be various mechanisms.

Although in the above embodiments the ink-jet printer has a line-type ink-jet head 2, it may have a serial-type ink-jet head.

The number of heads included in the printer is not limited to four, and the printer is not limited to a color printer.

The present invention may not always be applied to an ink-jet printer, but may be applied to an ink-jet type facsimile or copying machine for example.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing, from the spirit and scope of the invention as defined in the following claims.

What is claimed is:

1. An ink-jet recording apparatus comprising:
   a plurality of rollers;
   an endless conveyor belt that spans the rollers;
   a conveyor belt driving mechanism that rotates the rollers so as to move, in a predetermined conveyance direction, a record medium disposed on one surface of the conveyor belt;
   an ink-jet head that has a plurality of nozzles for ejecting ink to a record medium;
   an absorber that absorbs cleaning fluid and applies the cleaning fluid to the one surface of the conveyor belt by coming into contact with the one surface of the conveyor belt;
   a scraper that comes into contact with the one surface of the conveyor belt and scrapes the cleaning fluid attached to the one surface of the conveyor belt;
   a supplier that supplies cleaning fluid to the absorber; and
   a supply controller that controls a supply of cleaning fluid from the supplier to the absorber, in such a manner that the supply controller, in response to a print command, makes the supplier supply cleaning fluid to the absorber for a first period of time before the conveyor belt driving mechanism rotates the rollers to make the conveyor belt start traveling.

2. The ink-jet recording apparatus according to claim 1, wherein the scraper is disposed in a range, with respect to a direction of traveling of the conveyor belt, from a point where the absorber is in contact with the conveyor belt to a point where the conveyor belt confronts the ink-jet head.

3. The ink-jet recording apparatus according to claim 1, wherein, the supply controller makes the supplier regularly supply cleaning fluid to the absorber while a printing operation is performed by the ink-jet head.

4. The ink-jet recording apparatus according to claim 3, wherein a period of time during which the supply controller makes the supplier supply cleaning fluid to the absorber in a printing operation is shorter than the first period of time.

5. The ink-jet recording apparatus according to claim 3, wherein, in a printing operation, the supply controller makes the supplier supply cleaning fluid to the absorber every time a second period of time has elapsed.

6. The ink-jet recording apparatus according to claim 3, wherein, in a printing operation, the supply controller makes the supplier supply cleaning fluid to the absorber every time printing has been conducted on a predetermined number of record media.

7. The ink-jet recording apparatus according to claim 1, wherein the supply controller makes the supplier supply cleaning fluid to the absorber when a main power source of the ink-jet recording apparatus is powered up after an interval of not less than a third period of time since a last supply of cleaning fluid to the absorber was completed.

8. The ink-jet recording apparatus according to claim 7, wherein a period of time during which the supply controller makes the supplier supply cleaning fluid to the absorber at the time when the main power source is powered up is longer than the first period of time.

9. The ink-jet recording apparatus according to claim 1, wherein:

the supplier includes a tank that reserves therein the cleaning fluid which will be supplied to the absorber, a tube that connects the absorber to the tank, and a valve that opens or closes a passage which extends through the tube; and the supply controller controls opening and closing of the valve.

10. The ink-jet recording apparatus according to claim 1, wherein:

the supplier includes a tank that reserves therein the cleaning fluid which will be supplied to the absorber, a tube that connects the absorber to the tank, and a pump that transfers the cleaning fluid from the tank to the absorber; and the supply controller controls driving of the pump.

* * * * *